(12) United States Patent
Nutt et al.

(10) Patent No.: US 6,841,584 B2
(45) Date of Patent: Jan. 11, 2005

(54) REINFORCED PHENOLIC FOAM

(75) Inventors: Steven R. Nutt, Irvine, CA (US);
Hongbin Shen, Alhambra, CA (US)

(73) Assignee: University of Southern California, Los Angeles, CA (US)

( * ) Notice: Subject to any disclaimer, the term of this patent is extended or adjusted under 35 U.S.C. 154(b) by 3 days.

(21) Appl. No.: 10/392,316

(22) Filed: Mar. 18, 2003

(65) Prior Publication Data

US 2003/0187086 A1 Oct. 2, 2003

Related U.S. Application Data

(60) Provisional application No. 60/365,754, filed on Mar. 18, 2002.

(51) Int. Cl.$^7$ .................................................. C08J 9/00
(52) U.S. Cl. ...................... 521/136; 521/110; 521/181
(58) Field of Search ................................ 521/110, 136, 521/181

(56) References Cited

U.S. PATENT DOCUMENTS

| | | | |
|---|---|---|---|
| 3,673,130 A | * | 6/1972 | Papa et al. |
| 4,067,829 A | * | 1/1978 | Garrett |
| 4,163,824 A | | 8/1979 | Saidla |
| 4,365,024 A | | 12/1982 | Frentzel |
| 4,418,159 A | | 11/1983 | Rasshofer et al. |
| 5,137,831 A | | 8/1992 | Gruteser |
| 5,137,931 A | * | 8/1992 | Okumura et al. |
| 6,013,689 A | * | 1/2000 | Rader |

FOREIGN PATENT DOCUMENTS

| | | |
|---|---|---|
| JP | 03-086506 | 4/1991 |
| JP | 05-286069 | 11/1993 |
| JP | 05-318506 | 12/1993 |
| JP | 2000-119424 | 4/2000 |
| JP | 2001-011230 | 1/2001 |

OTHER PUBLICATIONS

Kiyotake Morimoto et al., "Adhesion Between Glass–Fiber and Matrix of Glass–Fiber Reinforced Rigid Polyurethane Foam Under Tension", 1994, Polymer–Plastics Technology and Engineering, 22(1), 55–76.

C.S. Karthikeyan et al., "Influence of Chopped Strand Fibres on the Flexural Behavior of a Syntactic Foam Core System", 2000, Polymer International 49: 158–162.

* cited by examiner

*Primary Examiner*—Morton Foelak
(74) *Attorney, Agent, or Firm*—Fish & Richardson P.C.

(57) ABSTRACT

Disclosed are compositions of short fiber reinforced phenolic foams, methods of making and using the same. The disclosed fiber-reinforced phenolic foams have a seven-fold increase in peel resistance over the unreinforced counterpart foam. The phenolic foam has enhanced fracture toughness without sacrificing the critical fire retardant properties.

20 Claims, 12 Drawing Sheets

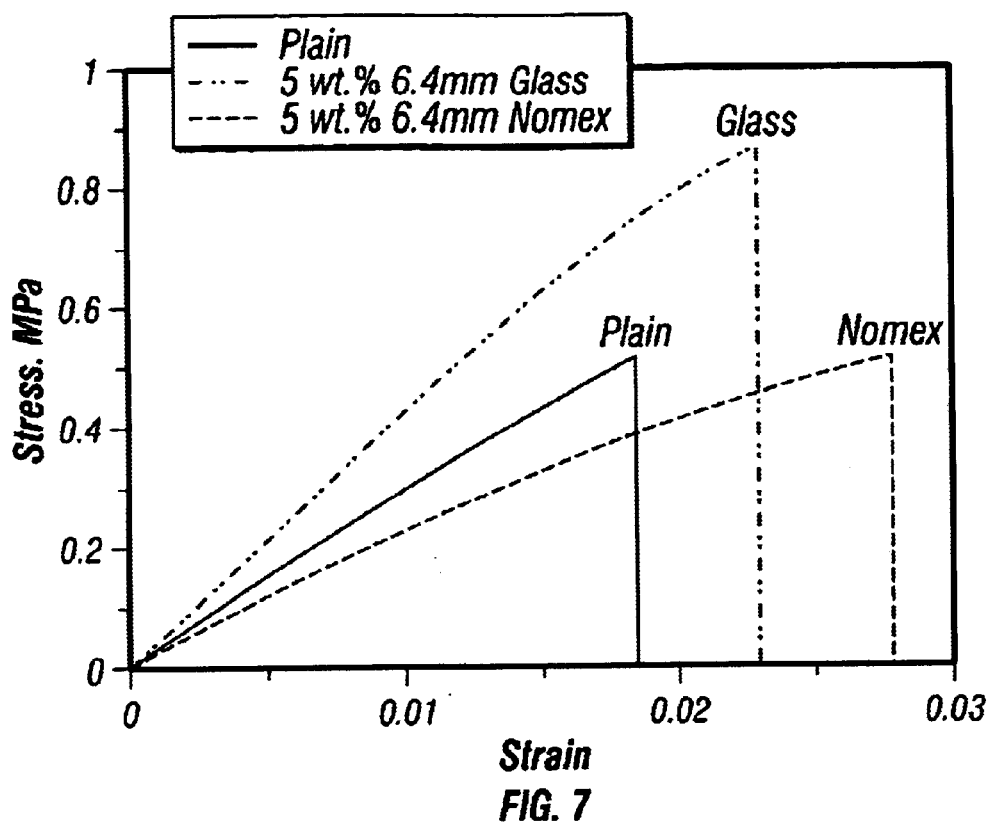
FIG. 7
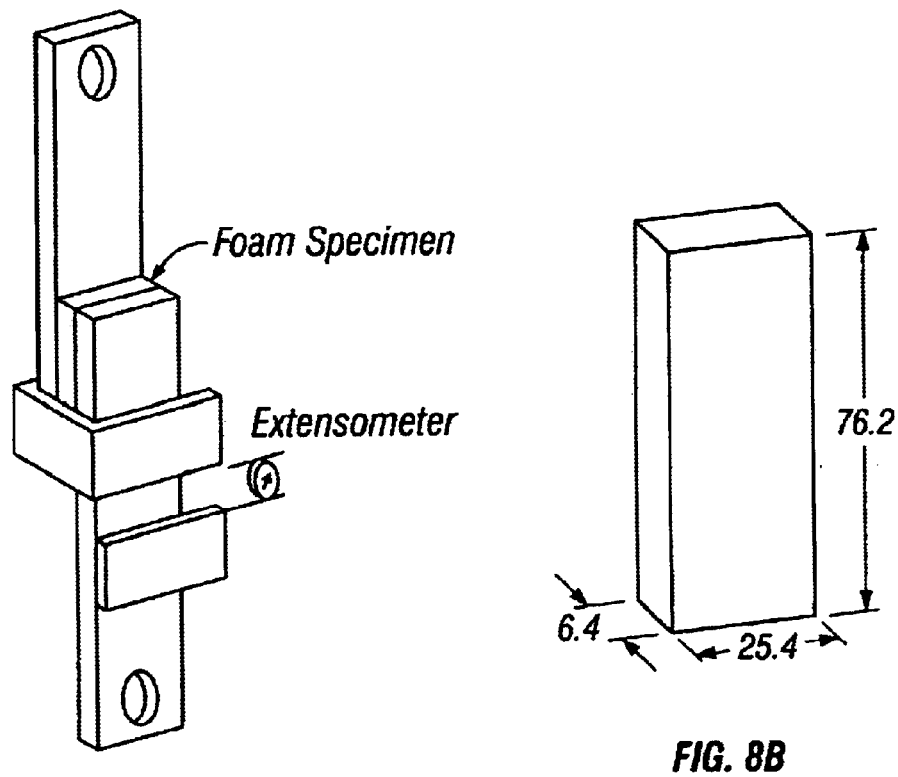
FIG. 8A
FIG. 8B

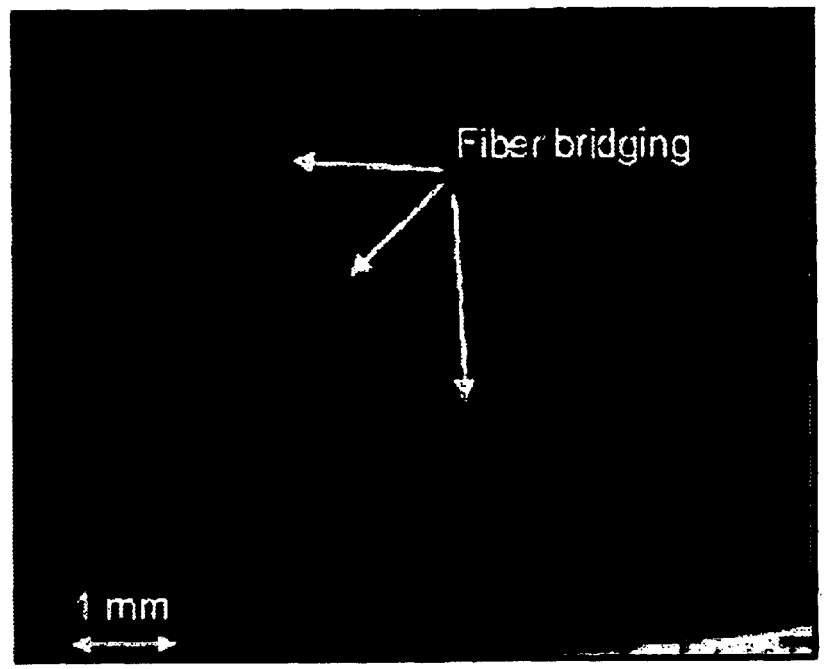
FIG. 15B
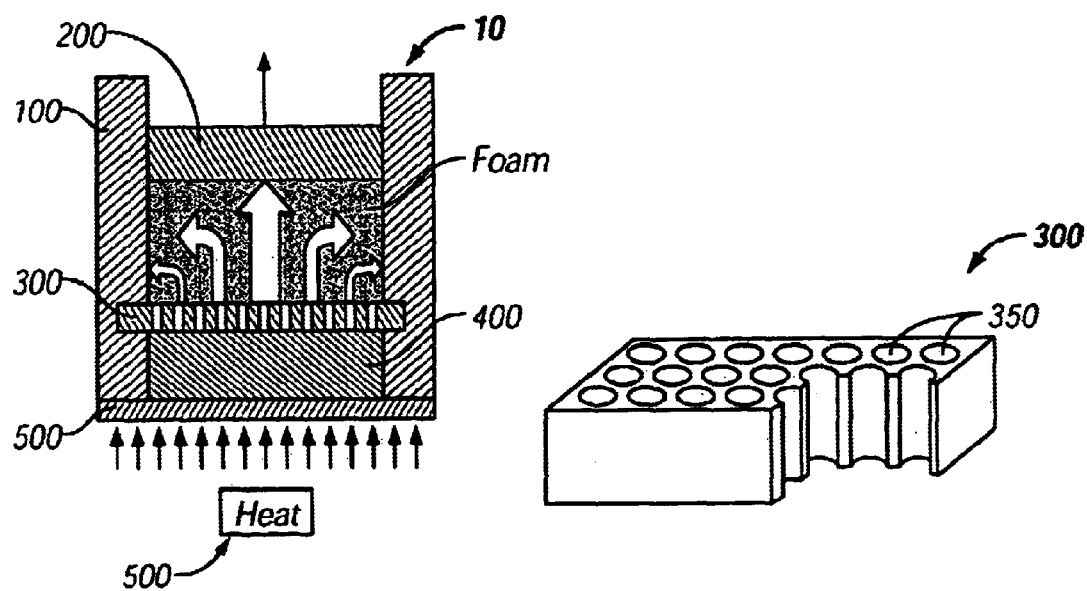
FIG. 16A  FIG. 16B

REINFORCED PHENOLIC FOAM

CROSS-REFERENCE TO RELATED APPLICATIONS

The present application claims priority under 35 U.S.C. §119 to U.S. Provisional Application Ser. No. 60/365,754, filed Mar. 18, 2002, the disclosure of which is incorporated herein by reference.

TECHNICAL FIELD

This invention relates to a phenolic foam, methods of making phenolic foam, and methods of using phenolic foam.

BACKGROUND

Phenolic foam is useful in various construction materials because of its superiority among resin foams particularly in flame retardance, heat resistance, low fuming properties, dimensional stability, solvent resistance, and fabricability. Phenolic foams are widely used in building applications in view of their thermal insulation and fire resistant properties.

Phenolic foams are thermally stable over a broad temperature range, maintaining performance and stability from −196° C. up to 200° C. The thermal conductivity of phenolic foam is low, which has led to a broad range of applications as an insulating material. Finally, phenolic foam is highly resistant to chemicals and solvents.

Phenolic foam, however, is extremely friable (A. H. Landrock (ed.), *Handbook of Plastic Foams*, Noyes Publications, New Jersey, 1995). As a consequence, phenolic foam has rarely been used as a core material in sandwich structures because the skin will not stay bonded. The extreme friability stems from the inherently brittle nature of the phenolic component. Phenolic foam of relatively low density (lower than 200 kg/m$^3$, suitable for consideration for weight-critical aerospace applications) crumbles readily, causing serious problems when used in structural sandwich panels. Frequently reported failures include skin debonding and susceptibility to damage during handling, causing excessive dust in the workplace. Friability is an important property of low-density foams, and is measured by mass loss due to surface abrasion and impact damage. For phenolic foam with a density below 100 kg/m$^3$, the friability is so high that severe problems arise in production and applications. For example, the friability of phenolic foam reportedly causes dust pollution in production areas and difficulties in bonding to other materials. Vibrations in service applications also cause problems that restrict and often preclude its use in structural applications with even the most modest load-bearing requirements. The friable nature of phenolic foam is believed to stem from the brittleness of the material (Landrock (ed.), Handbook of Plastic Foams, Noyes Publications, Park Ridge, N.J., USA, 1995; and Mao et al., Chem. Ind. Eng., 15(3):38, 1998). Consequently, the poor bond strength of phenolic foam when bonded to other materials has severely restricted its use in structural applications.

Phenolic foam receives much attention in fields where fire resistance is critical, such as building materials for civil construction, passenger and military aircraft, and naval vessels. However, structural applications of phenolic foam have been severely limited because of the extreme brittleness and friability. Since the late 1970s, some effort has been devoted to increasing the toughness of phenolic foam, as reviewed in Mao et al. (Chem. Ind. Eng., 15(3):38–43, 1998) and Knop an Scheip (Chemistry and Application of Phenolic Resins, Springer-Verlag, New York, 1979). Primary efforts have been devoted to identifying and incorporating chemical modifiers that impart flexibility and toughness to phenolic foam. Unfortunately, these efforts either were of little effect or severely compromised the desirable flammability, smoke density and toxicity (FST) properties. A second approach to increase toughness of phenolic foam has involved the addition of certain inert fillers. Finely ground fillers such as carbon black, talc, mica, asbestos, wood and cork flours typically improved the texture and homogeneity of foams, but these fillers generally led to much higher density foams (U.S. Pat. No. 2,446,429).

Currently, polyvinyl chloride (PVC) and polyurethane foams are popular choices for sandwich cores in structural applications. PVC foam is stiff and strong relative to most other foams, while polyurethane foam possesses medium stiffness and ease of processing. Both foams are widely used as sandwich core materials. However, polyurethane foam is flammable and produces toxic fumes during combustion. Though PVC foam has relatively low flammability, it releases toxic halogen-bearing gas under fire conditions. As material FST (flammability, smoke density and toxicity) standards become increasingly stringent worldwide, limitations of conventional structural foams may preclude their continued use.

SUMMARY

The invention provides short fiber reinforced phenolic foams the have a seven-fold increase in peel resistance over the unreinforced counterpart foam. The phenolic foam of the invention has enhanced fracture toughness without sacrificing the critical fire retardant properties.

The invention provides a composition comprising a phenolic foam material and a fibrous material. In one aspect of the invention the fibrous material comprises a flexible fibrous material.

The invention also provides a flexible-fibrous reinforced phenolic foam.

The invention further provides a composition comprising a phenolic resol resin; a surfactant; a phenol sulfate acid (PSA); a pentane; and a fiberous material.

The invention provides a fire resistant material comprising a phenolic foam reinforced with a fibrous material.

The invention also provides a fibrous-reinforced phenolic foam made by a method comprising mixing a phenol formaldehyde resin with a blowing agent, a cell stabilizer, a hardener, and a fibrous material, under conditions whereby the fibrous material is integrated into the phenolic foam.

The invention further provides a method of making a fibrous-reinforced phenolic foam, comprising mixing a phenol formaldehyde resin, a blowing agent, and a cell stabilizer, degassing the mixture, mixing in a fibrous material, allowing the mixture to cool, mixing in a hardener, and allowing the foam to form.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 7 is a graph depicting tensile stress-strain relationship of phenolic foams, in the foaming direction.

FIG. 8 shows a shear test configuration (A) and specimen geometry (B).

FIGS. 16(A) and (B) is a diagram of a chamber used for generating fibrous-reinforced phenolic foams.

Like reference symbols in the various drawings indicate like elements.

DETAILED DESCRIPTION

Figure 1A:
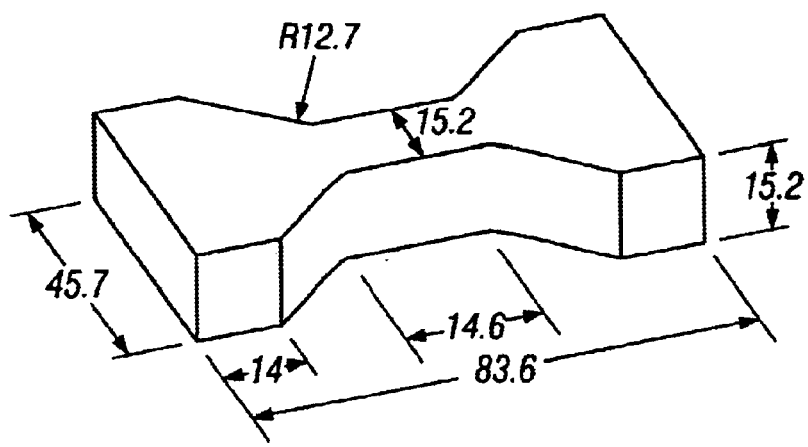
FIG. 1 shows a tensile test fixture. (A) Dog-bone specimen. (B) Fixture assembly.

As used herein and in the appended claims, the singular forms "a," "and," and "the" include plural referents unless the context clearly dictates otherwise.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the typical methods, devices and materials are described below.

All publications mentioned herein are incorporated herein by reference in full for the purpose of describing and disclosing the methodologies and compositions of the invention.

The invention provides compositions of short fiber reinforced phenolic foam and the associated fabrication techniques. In contrast to other publicized counterparts, short fibers are favored such that the fibers can be well dispersed into the foamable phenolic resin with appropriate techniques and that the resultant reinforced foam contains uniformly distributed and randomly oriented fibers.

Efforts to strengthen foams have been attempted (see, Japanese patent disclosures JP2001-011230 and JP2000-119424). Efforts to reinforce polyurethane foams with short fibers yielded encouraging results (U.S. Pat. No. 4,163,824; Morimoto et al., Polym. Plast. Technol. Eng., 22(1):55–76, 1984; and Karthikeyan et al., Polym. Int. 49:158–162, 2000). However, nearly all reports of fiber-reinforced foams were based on using relatively stiff glass fibers.

Phenolic foams are generally prepared by mixing a phenol formaldehyde resin with a blowing agent, a cell stabilizer and a hardener. Examples of blowing agents include so-called CFCs such as trichlorotrifluoroethane (CFC-113) and trichloromonofluoromethane (CFC-11), HCFCs such as dichlorotrifluoroethane (HCFC-123) and dichlorofluoroethane (HCFC-141b), HFCs such as 1,1,1,2-tetrafluoroethane (HFC-134a) and 1,1-difluoroethane (HFC-152a), and hydrocarbons such as cyclohexane, cyclopentane, and normal pentane. Phenolic foam is generally produced by expanding and curing a foamable composition prepared by uniformly mixing a resol resin obtained by polymerization of phenol and formalin in the presence of an alkaline catalyst, a blowing agent, a surface active agent, a curing catalyst, and other additives.

Some flexible fibers, particularly aramid fibers such as Kevlar® or Nomex® (trade names for aramid fibers produced by DuPont), have a well-known affinity for phenolics. The invention demonstrates that these materials and similar materials provide an effective material for reinforcing phenolic foams. Furthermore, from the viewpoint of flame resistance, such aramid fibers are highly desirable. The invention provides phenolic foams that comprise flexible fibrous materials (e.g., aramid fibers). The presence of the flexible fibrous material (e.g., aramid material) increases the toughness of phenolic foam.

Short fibers of any type, but typically glass and Nomex® can be used. Discrete filaments of one specific fiber-type or mixtures of different fibers can be used. The fibers are chopped into a length between about 0.5 mm to 30 mm with any type of cutting method (e.g., 1.5 mm (0.0625 inch) and/or 6.4 mm (0.25 inch)). Glass fibers free of any sizing or with phenolic compatible sizing can be used, while Nomex fibers are typically sheer and clean.

The amount of fibers added into a foamable phenolic resin composition can be varied. Consideration of such factors as the fiber length being chosen, the desired extent of enhanced foam properties, the ease of processing, the production cost, and like, are taken into account in determining the amount of fiber to be used. Typically, fiber loading should be no less than 3 wt. %, preferably above 5 wt. %, in order to achieve a desirable level of enhancement of foam properties.

Typically, a foamable phenolic resin composition includes a thermal curable resol-type phenolic resin, at least one surfactant, a blowing agent and an acid catalyst. The curing conditions can be varied with respect to the type and amount of each of the added components. However, the curing temperature should range within 30–90° C., typically about 50–70° C.

The reinforced phenolic foams provided by the invention can be of any density greater than 20 kg/m$^3$, but a density range of 35 to 300 kg/m$^3$ is typical of the foams.

The invention demonstrates that fiber reinforcement improves all aspects of the performance of phenolic foams.

The composite phenolic foams of the invention surpass the performance of commercially available polyurethane foams at equivalent density. For example, composite phenolic foam-aramid fiber composites of the invention demonstrated enhanced toughness, reduced the friability, and improved the isotropic property of phenolic foam. As another example, phenolic foam-glass fiber composites of the invention demonstrated a stiffening and strengthening effect, especially in the direction of foam rising.

The invention provides compositions comprising a phenolic foam reinforced with a flexible fibrous material. The flexible fibrous material is integrated into the phenolic foam. In one aspect of the invention, a combination of glass fiber and aramid fibers may be used, glass fibers only, or aramid fibers only. In another aspect, the invention provides methods of designing a phenolic foam composite based upon the stress requirements of the foam for a particular use. For example, the different effects achieved by the fiber reinforcements (e.g., glass or aramid) demonstrate that judicious selection of fiber additives in optimal proportions can produce engineering materials that are tough, fire-retardant, strong and affordable for a variety of structural applications.

The invention provides phenolic foam composites that show an increase in peel resistance and toughness. For example, phenolic foam-aramid fiber composites of the invention provide a seven-fold increase in peel strength.

A short fiber reinforced phenolic foam of the invention can be prepared as follows. First, a foamable phenolic resin composition is sufficiently mixed, into which is cast the pre-weighed short fibers, followed by hand mixing and/or stirring with appropriate tools at moderately slow speed. Because the addition of fibers causes the viscosity of a foamable phenolic composition to increase, the mixing or stirring becomes difficult when fiber length is relatively long and fiber loading high. In one aspect, a motor-driven device may be used as an alternative to hand mixing, such as an advancing cavity type pump, or a mixer not based on blade-stirring, for example, a Keyence Hybrid Mixer™, or a interface generator as detailed in U.S. Pat. No. 3,404,869. The resulting fiber slurry is poured into a mold. Heat is applied and maintained until the resultant foam becomes fully set. After removal from the mold the foam can be further dried by, for example, using a ventilated chamber for a desired period of time. In most cases, the dried foam should be treated with a neutralizing agent to eliminate the residual acid catalyst in the foam.

In another aspect of the invention, a fiber-reinforced phenolic foam is provided. The fiber-reinforced phenolic foam is made a process comprising mixing a phenol formaldehyde resin with a blowing agent, a cell stabilizer, a hardener and a fibrous material. In one aspect, the fibrous reinforced phenolic foam is made by mixing a resole phenolic resin—100 parts, Pel-stab 9738—3 parts, Dabco 193—1 part, n-Pentane (>99% purity)—1 to 4 parts, PSA (phenolsulfonic acid, 65% concentration)—3 to 4 parts, and a fibrous material (e.g., a flexible fibrous material such as Aramid Nomex® staples or glass fiber staples) ⅛ in. to ¼ in. chop length—3 to 15 parts.

The amounts of each of the materials listed above, can be empirically adjusted by one of skill in the art depending upon the desired strength and use of the fibrous-reinforced phenolic foam. For improved fiber dispersion, a special mold design can be used. The mold design is depicted in FIG. 16. The mold provides one or more combinations of several hole plate(s), each with arrays of holes of a predetermined size. The plate(s) exert a shear force on the foaming compositions to break air bubbles and re-distribute the fibers. By choosing a particular hole plate(s) in combination with an appropriate mixing techniques, uniform dispersion of short fibers in foamable phenolic compositions can be achieved.

With reference to FIG. 16 there is depicted a foam generating chamber 10. The generating chamber 10 comprises at least one wall 100 having an outside and an inside, the at least one wall defining a void space, a top plate 200, and at least one bottom plate 300. The chamber 10 includes a top movable plate 200 that fittably seals with the inside of the at least one wall 100. A bottom hole plate 300 comprises a plurality of holes 350 (see also FIG. 16b). Immediately below that hole plate 300 is a mixing chamber 400. The mixing chamber 400 comprises at least one wall that may be contiguous with the wall 100, a top plate that is in liquid communication with hole plate 300, and a bottom plate 500. The bottom plate 500 is in thermal communication with a heating element.

During use a foam formulation as described above (e.g., Resole phenolic resin, Pel-stab 9738, Dabco 193, n-Pentane, PSA, and fibrous material) is placed/injected into the mixing chamber 400. A heating element heats bottom plate 500 thereby heating the foam formulation within the mixing chamber 400. As the foam formulation is heated it is thermally expanded such that the foam flows through holes 350 in hole plate 300 into generating chamber 10. The movable plate 200 maintains a pressure on the thermally expanding foam and moves upwards within the chamber as the amount of thermally expanded foam increases in generating chamber 10.

The following examples are provided to illustrate the practice of the instant invention, and in no way limit the scope of the invention.

EXAMPLES

Preparation of Phenolic Foams

The following composition was formulated to apply with a Keyence Hybrid Mixer (HM-560), which involves simultaneous revolution and rotation of the mixing container at high speed. This mixer works without any stirring blades thus minimizing entrapped air bubbles during mixing. However, due to the friction between fibers driven by the high-rate shear flow of the resin, a significant temperature rise may occur when the fiber loading is relatively high. The following formulation and procedures are developed by taking into consideration the features offered by this mixing technique.

| Composition 1 | |
|---|---|
| Resole phenolic resin (HRJ-13641, Schenectady Chemical Co.) | 100 parts |
| Pel-stab 9738 (Elf† Corp.) | 3 parts |
| Dabco 193 (Air Products) | 1 part |
| n-Pentane (>99% purity) | 3 parts |
| PSA (phenolsulfonic acid, 65% concentration, CapStal Resin Corp.) | 4 parts |
| Aramid Nomex ® staples (¼ in. chop length) | 5 parts |

Phenolic resin, Pel-stab and Dabco are all weighed into a polyethylene container suitable for use in the hybrid mixer. The container is then placed in the mixer and subjected to 1 minute mixing plus 1 minute degassing. After addition of the fiber, the container is subjected to an additional 2 minutes of mixing in the mixer. Usually, a significant temperature rise of the mix can be observed at the end of this step. Thus the container is placed inside a refrigerator for 1–2 hours, allowing the contents to cool down to below 45 degrees. Pentane and PSA are pre-weighed and poured into the cold container, followed by another 2 minutes of high speed mixing. The resultant mixture is transferred into a pre-fabricated mold. The mold is built of 1.5 inches thick commercial polystyrene foam panels, with a movable top cover to allow the free rise of foaming inside. The curing process is performed at ambient condition and takes 1–2 hours to complete.

The post-cure treatment of the foam included a neutralization process that was carried out after the cured foam was removed from the mold. A pressure chamber connected to an ammonia source was used. It may take 1–2 days for the foam to be thoroughly neutralized, depending on the applied pressure of ammonia, the size of foam block and the thickness of hard skins on foam surface. The neutralized foam was placed in a ventilation chamber for about 3 days, allowing the foam to further dry out.

By the above fabrication method, the finished foam was yellowish color and of about 5 pcf (pounds per cubic feet) density. Fibers were uniformly dispersed throughout the foam without any visible fiber bundles or congregates. The formulation was typically comprised of phenolic resol resin (solid content>80%) 100 parts, surfactants 2 parts, phenol sulfate acid (PSA) 4 parts, and appropriate amounts of pentane to achieve desired foam densities. When fiber reinforcements were introduced, the amount of PSA was slightly reduced to allow more time for dispersing fibers. To facilitate comparisons between properties of different foams, all foams were formulated to achieve a density of 80±10 kg/M$^3$ (5±0.5 pounds per cubic foot).

Another foam can be made from the formulation shown below, with the same fabrication procedures as above being followed.

| Composition 2 | |
|---|---|
| Resole phenolic resin (HRJ-13641, Schenectady Chemical Co.) | 100 parts |
| Pel-stab 9738 (El† Corp.) | 3 parts |
| Dabco 193 (Air Products) | 1 part |
| n-Pentane (>99% purity) | 2 parts |
| PSA (phenolsulfonic acid, 65% concentration, CapStal Resin Corp.) | 4 parts |
| Aramid Nomex ® staples (⅛ in. chop length) | 15 parts |

The finish foam is yellowish in color and of about 10 pcf density. Fibers are uniformly dispersed throughout the foam without any visible fiber bundles or congregates.

Another foam can be made from the formulation shown below, with the same fabrication procedures as above being followed.

| Composition 3 | |
|---|---|
| Resole phenolic resin (HRJ-13641, Schenectady Chemical Co.) | 100 parts |
| Pel-stab 9738 (El† Corp.) | 3 parts |
| Dabco 193 (Air Products) | 1 part |
| n-Pentane (>99% purity) | 3 parts |
| PSA (phenolsulfonic acid, 65% concentration, CapStal Resin Corp.) | 4 parts |
| Glass fiber staples (¼ in. chop length) | 5 parts |

The finish foam is yellowish in color and of about 5 pcf density. Fibers are uniformly dispersed throughout the foam without any visible fiber bundles or congregates.

Another foam can be made from the formulation shown below, with the same fabrication procedures as above being followed.

| Composition 4 | |
|---|---|
| Resole phenolic resin (HRJ-13641, Schenectady Chemical Co.) | 100 parts |
| Pel-stab 9738 (El† Corp.) | 3 parts |
| Dabco 193 (Air Products) | 1 part |
| n-Pentane (>99% purity) | 1 part |
| PSA (phenolsulfonic acid, 65% concentration, CapStal Resin Corp.) | 4 parts |
| Glass fiber staples (¼ in. chop length) | 15 parts |

The finish foam is yellowish in color and of about 15 pcf density. Fibers are uniformly dispersed throughout the foam without any visible fiber bundles or congregates.

Alternative mixers can be used instead of the Keyence Hybrid Mixer, but the formulation and fabrication procedures have to be adjusted accordingly. For a planetary dual-blade mixer, the following formulation and procedures are used.

| Composition 5 | |
|---|---|
| Resole phenolic resin (HRJ-13641, Schenectady Chemical Co.) | 100 parts |
| Pel-stab 9738 (El† Corp.) | 3 parts |
| Dabco 193 (Air Products) | 1 part |
| n-Pentane (>99% purity) | 4 parts |
| PSA (phenolsulfonic acid, 65% concentration, CapStal Resin Corp.) | 3.5 parts |
| Aramid Nomex ® staples (¼ in. chop length) | 3 parts |

In another aspect, the following fabrication method is used. Phenolic resin, Pel-stab and Dabco are all weighed and added into a clean stainless mixing bowl of the planetary mixer. The bowl is then placed in the mixer and subjected to high speed stirring for 2 minutes. After pentane is added, the mixing is executed at slow speed for 1 minute and at high speed for 2 minutes, PSA is pre-weighed and poured into the bowl, followed by another 2 minutes high speed mixing. Fiber is added into the mixture and the mixing speed is kept low for 2–5 minutes depending on the bowl capacity and the viscosity of fiber slurry. The resultant mixture is transferred into a pre-fabricated mold. The mold can be constructed with 1.5 in. thick commercial polystyrene foam panels, and has the general structure as shown in FIG. 16. The mold provides one or more combinations of several hold plate(s), each with arrays of holes of a predetermined size. The plate(s) exert a shear force on the foaming compositions to break air bubbles and re-distribute the fibers. By choosing a particular hole plate(s) in combination with an appropriate mixing techniques, uniform dispersions of short fibers in foamable phenolic compositions can be achieved. The curing process is performed by heating at 170 degrees for about 6–8 hours. The post-cure treatment of the foam is the same as above. The finish foam is obtained in yellowish color and of about 5 pcf (pounds per cubic feet) density. Fibers are uniformly dispersed throughout the foam with few visible fiber bundles or congregates.

The chopped fibers used in this study included glass strand and aramid fibers, each having lengths of 1.5 mm (0.0625 inch) and 6.4 mm (0.25 inch). The glass fibers made by Owens-Corning Inc. were about 14 $\mu$m in diameter and included a phenolic compatible sizing. Aramid fibers (Nomex®) were obtained from DuPont, and were about 12 $\mu$m in diameter.

The climbing drum peel test was used to assess the effectiveness of fiber reinforcement on enhancing foam toughness. Peel resistance is directly related to the engineering problems that most severely restrict the use of phenolic foam in structural applications: poor toughness and friability. Peel strength scales closely with the interfacial fracture energy, GI, normally measured by double cantilever beam tests (DCB). Because of the poor bond strength and low stiffness of phenolic foam at low densities, peel test is more practical than the conventional techniques for measurement of fracture toughness. Furthermore, certain widely used industrial standards, such as the Boeing Production Specifications (BPS-D124), accept the climbing drum peel test as an accurate assessment of peel resistance for sandwich panels. Climbing drum peel tests were performed in accordance with ASTM D1781, except that the specimen width was reduced to 25.4 mm (1 inch). Phenolic foams were first cut to bars 25.4 mm wide, 31.8 mm thick, and 177 mm long. Then aluminum tape facings (25.4 mm wide and 0.2 mm thick) were bonded to both sides of the foam bars using an epoxy film adhesive. The adhesive was cured at 120° C. for 3 hours, and consolidated under a vacuum bag. The peel strength was obtained by averaging the force exerted over the entire peeling distance, and was expressed in N·mm/mm.

Figure 1B:
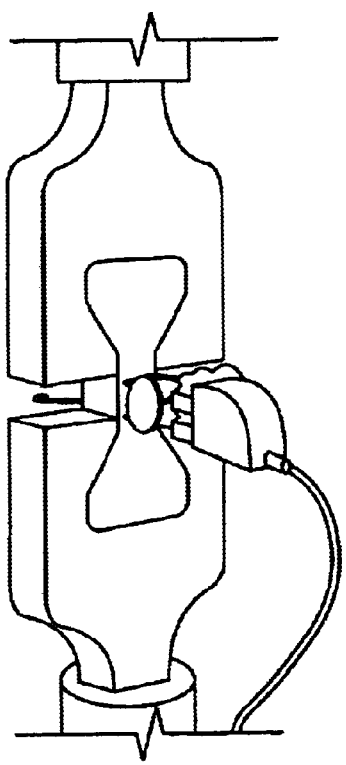

Tensile tests were conducted in accordance with ASTM D1623. Because of the difficulty in attaching specimens to conventional grips, a special test fixture was developed for holding the dog-bone shaped tensile specimen. The configuration of the experimental setup and the specimen dimensions are shown in FIG. 1. A series of tests were undertaken beforehand to validate the test setup. These tests, using well-characterized commercial polyurethane foam, showed good reproducibility and agreement with the manufacturer's data. Dog-bone shaped specimens were machined on a CNC router machine and sliced to the desired thickness using a diamond bandsaw.

All mechanical tests were performed at ambient conditions using an Instron 8500 universal test machine. For each material, at least three replicates were tested for every specimen and the final data were given as the average of all replicates within a 95% confidence limit.

A Cambridge 360 scanning electron microscope (SEM) was employed to observe the fracture surfaces of foam specimens. Samples were carefully cut from the freshly peeled surfaces using a razor blade. Gold sputtering onto the sample surface was used to impart electrical conductivity. The operation voltage of the SEM was 10 kV. SEM images were recorded in a high-resolution electronic format and processed later with computer software.

Figure 2:
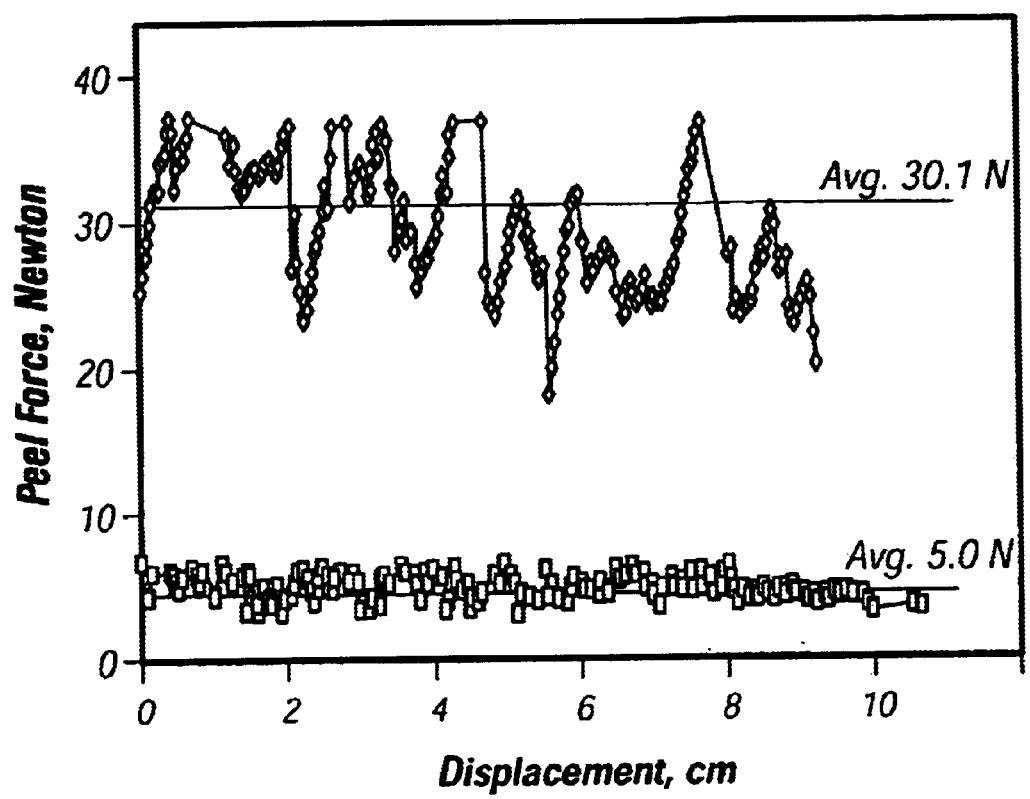
FIG. 2 is a peel diagram of phenolic foams. (A) 3 wt. % 6.4 mm aramid fiber reinforced. (B) plain.
Figure 3A:
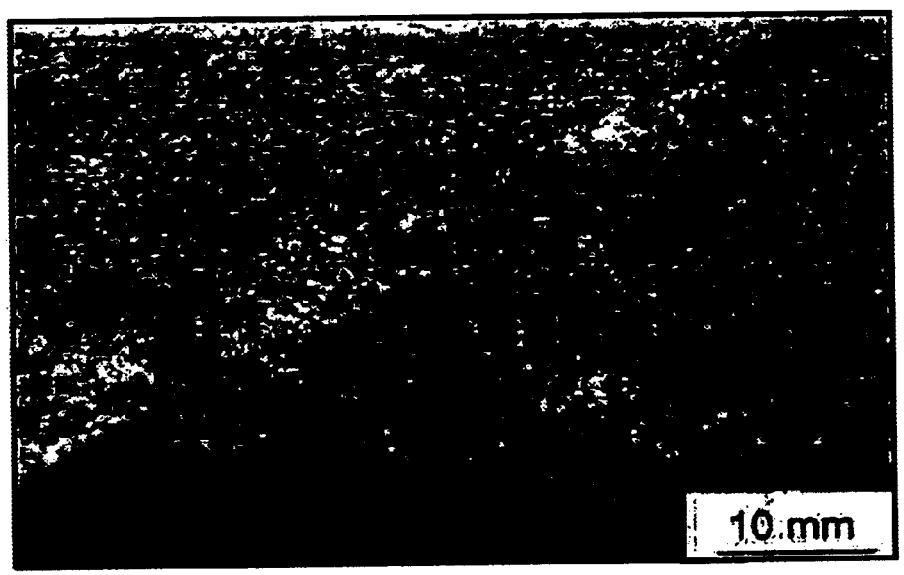
FIG. 3 collectively show images of peeled face skin surface. (A) 3 wt. % 6.4 mm aramid fiber reinforced phenolic foam. (B) Plain phenolic foam.
Figure 3B:
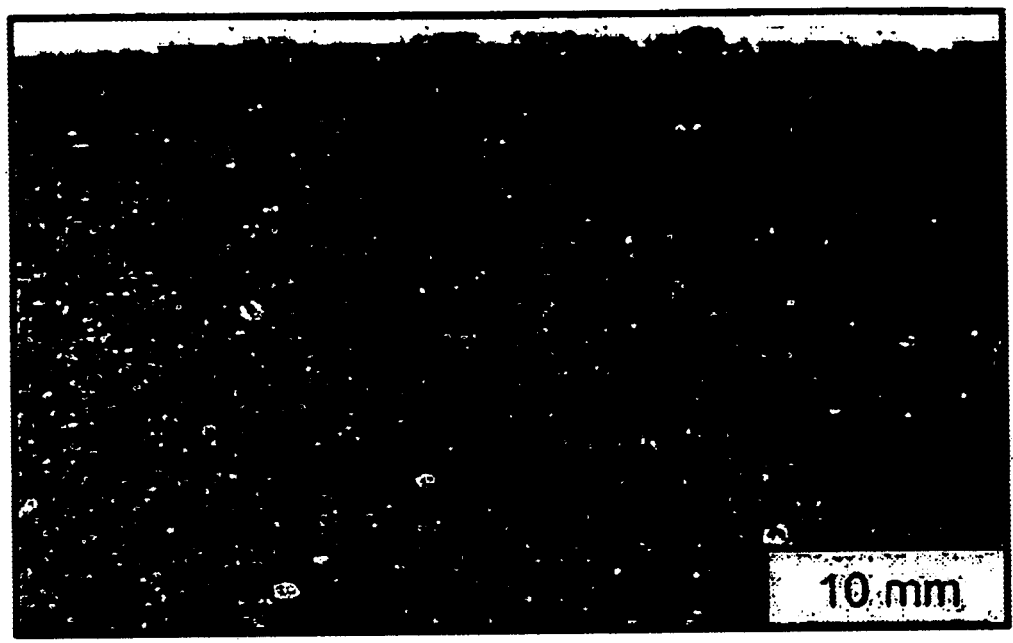

During peel tests, specimens typically exhibited substantial fluctuations in the peeling force as the face sheets separated from the foam. To illustrate this, a typical peeling force-distance diagram is shown in FIG. 2, which includes data from a plain (unreinforced) phenolic foam and from a foam reinforced with 3 wt. % aramid fibers. These fluctuations are typical of other peel test methods (Xie an Karbhari, J. Comp. Mat. 32(21):1894–1912, 1998; and Hulcher et al., J. Adv. Mat., 31(3):37–43, 1999), and reflect the uneven fracture propagation at the peeling front. In peel tests of most materials, crack propagation occurs within the adhesive layer or within the adherents, but for the phenolic foam samples in this study, cracks always propagated through the foam side, as evidenced by the foam surfaces left behind the advancing crack (FIG. 3). This is because the porous, dusty surface of phenolic foam was likely to introduce bonding defects, which subsequently became the weakest layer for crack propagation at the foam/adhesive interface. When cracks advanced into plain phenolic foam, the maximum depth was typically a few cell diameters. In contrast, the presence of fibers in the foam dramatically increased the depth by deflecting the crack deeper into the foam, thus resulting in the much rougher fracture surface shown in FIG. 3a. Thus, crack propagation in the reinforced foam was consequently a much more tortuous and difficult process than in the plain foam as shown in FIG. 3b. Occasionally, this deflection was so strong that the peel front became uneven, and fiber bridging of the crack wake was clearly witnessed. These observations resemble the findings by Shetty et al. in their study of fiber-reinforced adhesives (Scripta Materialia, 37(6):787–797, 1997).

The peel strength of a material is closely related to its facture toughness. For example, Hulcher et al compared the peel process with the standard double cantilever beam (DCB) toughness test and postulated that the peeling strength was directly related to the fracture toughness, GI, of the material (J. Adv. Mat., 31(3):37–43, 1999). Furthermore, Xie and Karbhari (supra) derived a formula correlating the interfacial fracture energy G with the peel strength, which also involved the effects of peel angles and material properties of the face sheets. In this context, the peel test data provided herein may be viewed as representative of the fracture toughness of phenolic foams.

As shown in FIG. 2, fiber reinforcement greatly increases the peel strength of phenolic foam. Adding only 3% by weight of aramid short fibers caused an almost six-fold increase in the peel strength of the plain foam, while adding 5% by weight resulted in a seven-fold increase. Additional data for other fiber types and amounts are listed in Table 1. The data show significant improvements in the peel resistance (and hence toughness) of all reinforced phenolic foams compared with the plain foam. The data lead to the conclusion that fiber reinforcement significantly improves the peel resistance of phenolic foam. Furthermore, increasing fiber loading and fiber length increases the toughness, and aramid fibers are more effective than glass fibers in enhancing the peel strength for equivalent loadings and fiber lengths.

TABLE 1

Peel data of phenolic foams.

| Loading, % | Plain foam | Glass filled 1.5 mm | Glass filled 6.4 mm | Aramid filled 1.5 mm | Aramid filled 6.4 mm |
|---|---|---|---|---|---|
| 0 | 5.0 | — | — | — | — |
| 3 | — | 8.4* | 14.5 | 14.7 | 25.3 |
| 5 | — | — | 15.7 | — | 36.2 |

*2.5 wt. %

Chopped glass fibers effect the tensile properties of polyurethane foams. Through careful microscopic observations the fibers first arrested propagating cracks and then diverted the cracks along the fiber length, dissipating energy in the process. Thus, fiber reinforcement of foam altered the mode of crack growth and resulted in higher fracture toughness.

Figure 4A:
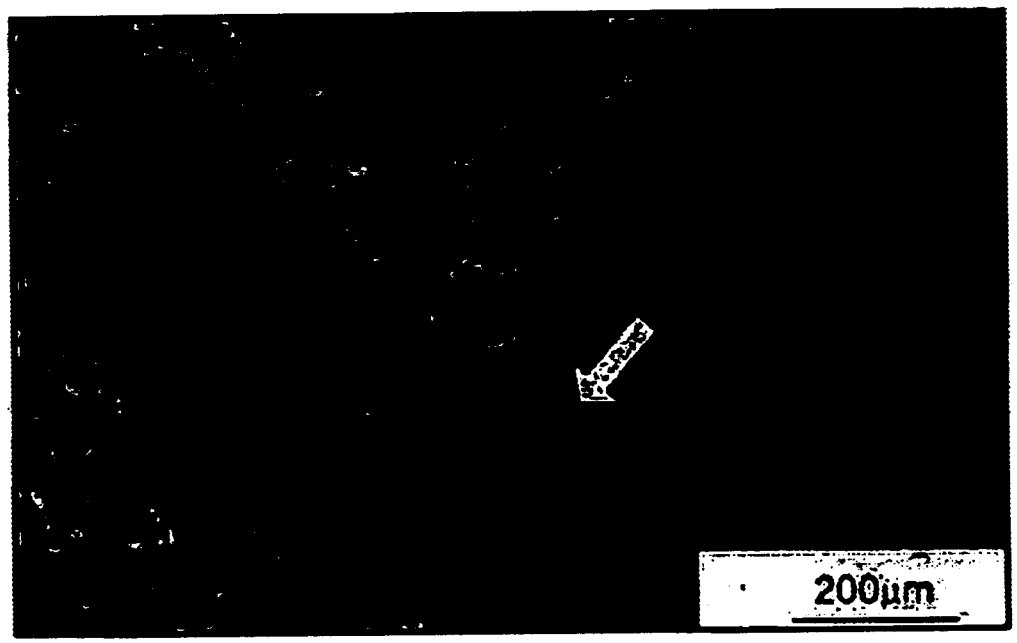
FIG. 4 is an image acquired by SEM of glass fiber fragments on fractured surfaces of phenolic foam. (A) Global view. (B) Magnified view of the arrowed region in (A).
Figure 4B:
Figure 5A:
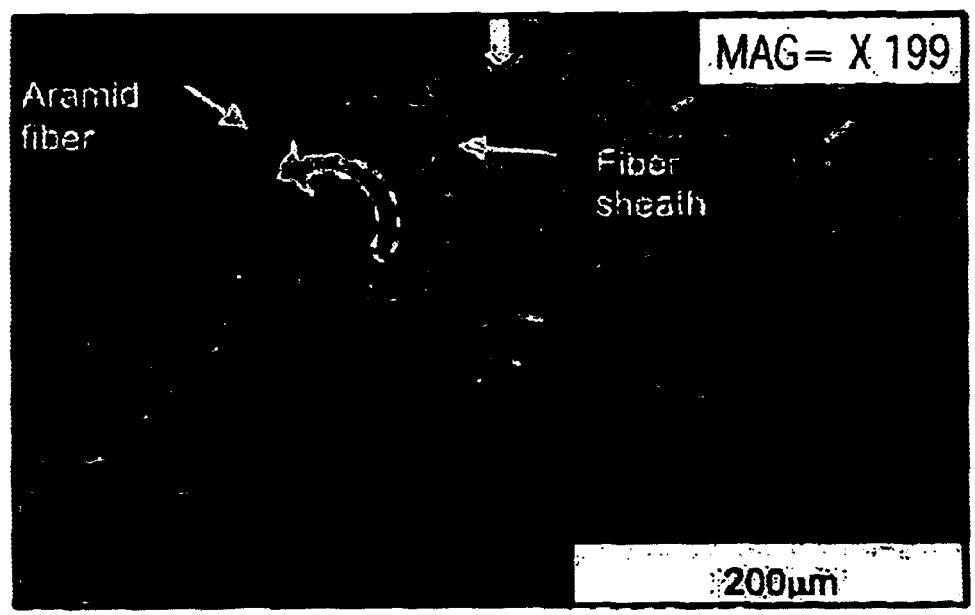
FIG. 5 is an image acquired by SEM of aramid fiber fragments on fractured surfaces of phenolic foam. (A) global view. (B) Magnified view of the arrowed region in (A). (C) Clean aramid fiber end.
Figure 5B:
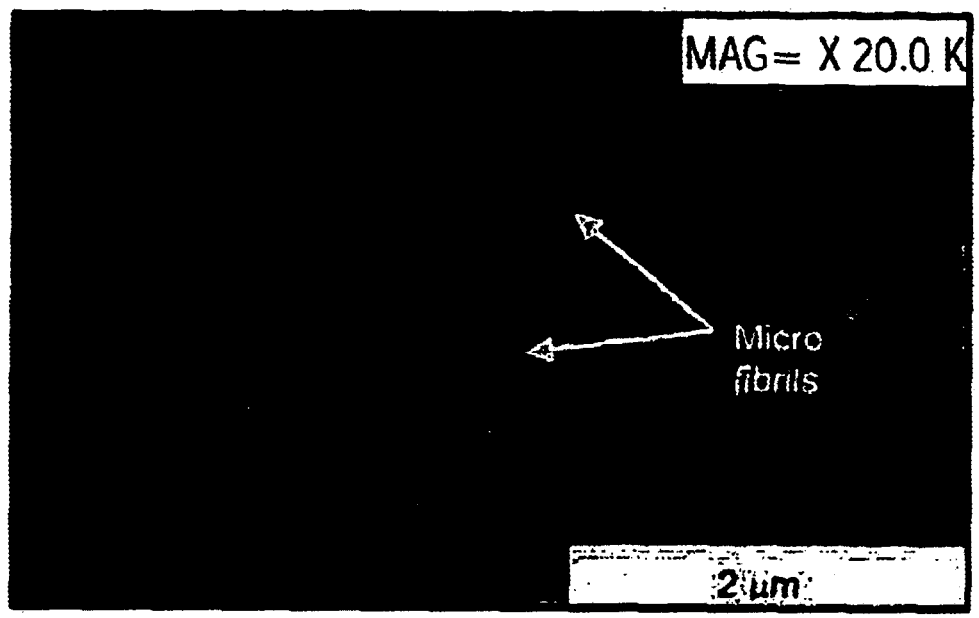
Figure 5C:
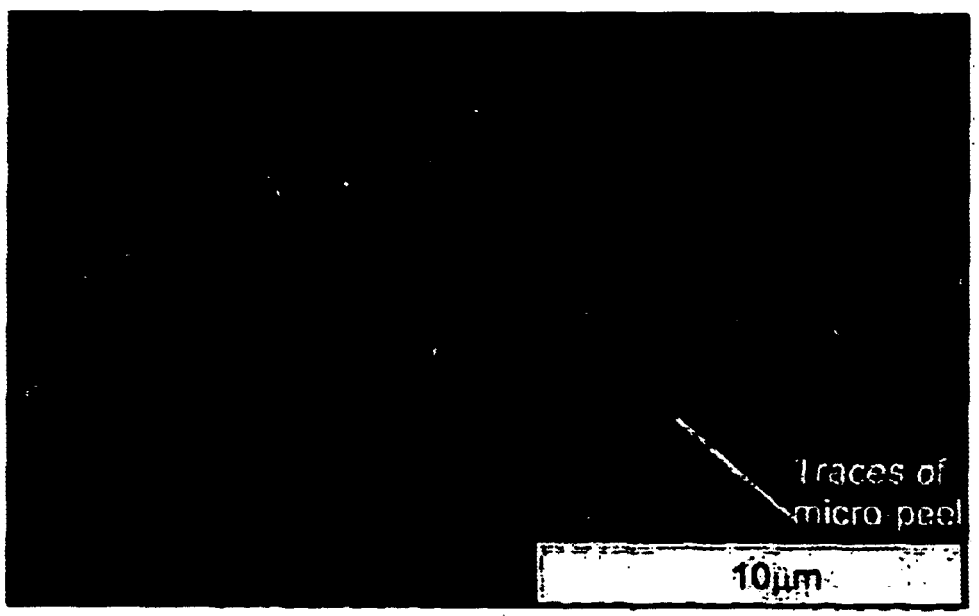

Fracture modes during peel were also modified by fiber reinforcement in the phenolic foam compositions of the invention, although a different phenomenon was also observed in some cases. FIG. 4 shows a typical fracture surface of glass reinforced phenolic foams. The glass fiber tips exposed on the fracture surface were typically encased in phenolic sheaths, indicating negligible pullouts. However, a distinctively different phenomenon was observed in foams reinforced with aramid fibers, as shown in FIG. 5. The micrograph shows a foam fragment at the fracture surface containing aramid fiber tips, from which it appears that the fiber had been initially pulled out of its phenolic sheath and then bent during the fracture. Unlike the glass fibers in FIG. 4, which were encased in phenolic, the aramid fiber ends are almost bare of phenolic fragments. This observation suggests that the aramid fibers were less well bonded to the phenolic matrix than glass fibers. Nevertheless, closer inspection of the sheath separated from the fiber revealed a more subtle "micro-peeling" process (FIG. 5b), The image shows an enormous number of tiny fibrils, each with diameter less than 0.1 microns, that had been either pulled out or peeled off the aramid fiber stem. To support this contention, an image of a clean fiber end is shown in FIG. 5c, from which traces of the micro-peel process can be clearly seen on the fiber surface.

Figure 6A:
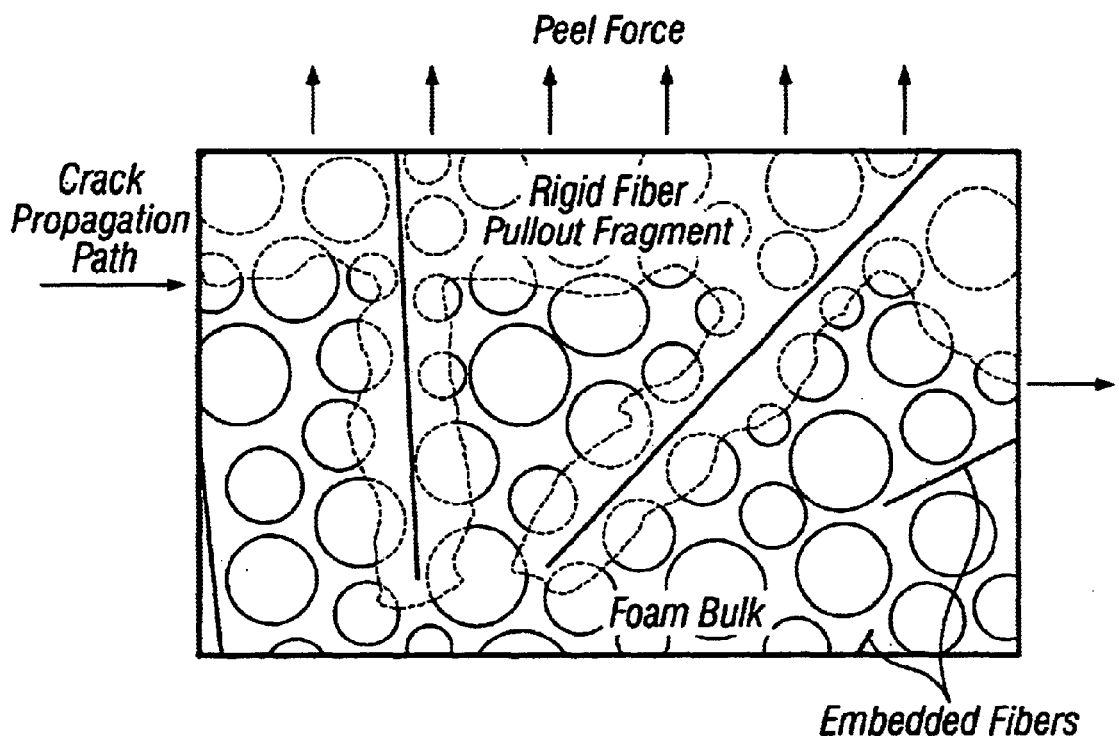
FIG. 6 is an illustration of different fracture behavior in reinforced phenolic foams, showing local phenomena of crack progression near fibers. (A) Stiff glass fiber. (B) Flexible aramid fiber.

The illustrations in FIG. 6 are provided in an effort to clearly distinguish between the different fracture behaviors associated with the two fibers. Stiff glass fibers, as depicted in FIG. 6a, behave under external force in a way similar to Cotgreave et al.'s observations of glass fibers in polyurethane foam (J. Mat. Sci., 12:708–717, 1977). According to their observations, the cracks initiated in the foam are first arrested by the fibers in the propagation path. Then, because there is always a stress concentration at the ends of the fibers, cracks deflect towards the fiber ends. When the crack advances around the fiber, strain energy is released, leaving behind a tip of the sheathed fiber, which is what appears in FIG. 2. Globally, this fracture process leads to fiber bridging along the fracture surfaces, as noted previously. In addition, most phenolic foam cells ruptured along the mid-span of the struts, as postulated by Gibson and Ashby for brittle foam fracture (*Cellular Solids: Structure and Properties*, Cambridge University Press, UK, 1997). This observation indicates that the fibers functioned primarily as long-range reinforcements, with little effect on the local mechanics of individual foam cells.

Figure 6B:
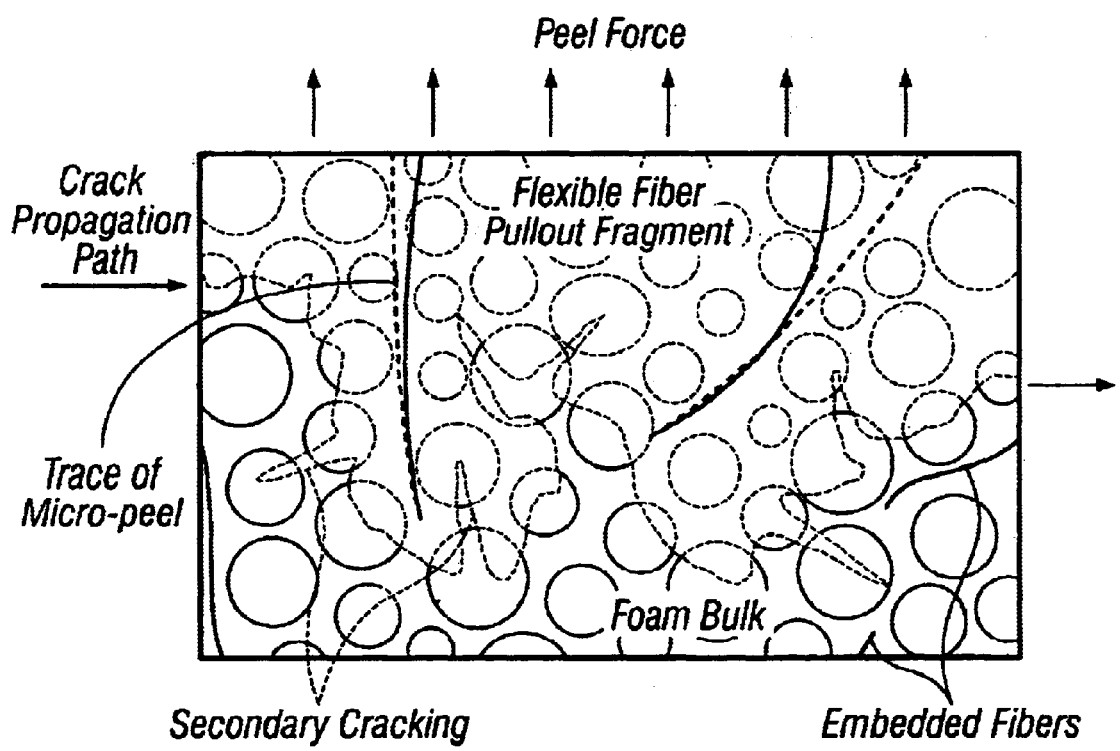

In contrast, the aramid fibers provide little resistance to bending because of poor compression strength (Hyer et al., Stress Analysis of Fiber-reinforced Composite Materials, McGraw-Hill Inc., US, 1998). If oriented away from the direction of applied force, the fibers tend to orient to the loading direction (FIG. 6b). However, the phenolic matrices that envelop and connect the fibers are too stiff and brittle to accommodate the reorientation. Consequently, interfacial failure initiates between the fiber and the surrounding matrix, followed by a "micro-peel" process in which the fiber separates from its phenolic sheath and bends towards the loading direction. During the micro-peel process, large amounts of energy are dissipated. Meanwhile, the micro-peel process proceeds gradually, diminishing the stress concentration, inducing secondary cracks that branch into adjoining regions, and enlarging the fragmented, or damaged, volume. In comparison, foam reinforced with glass fibers exhibits a much smaller fragmented volume. This difference explains why aramid-reinforced foam has a rougher fracture surface than the glass-reinforced foam. The different fracture mechanism and larger damage zone associated with aramid fibers (versus glass fibers) is responsible for the greater increase in the peel resistance and toughness.

Because of the multi-variable complexity of foam compositions, a design-of-experiments (DOE) approach was used to identify the most important variables affecting the peel resistance of phenolic foam. DOE is widely used to study complex systems that involve multiple factors and the interactive effects between them (Porter et al., Pharm. Technol. October, p.1–7, 1997). The primary benefit of DOE is the efficiency of the experimental plan required to extract sufficient information about the system. In this study, several factors were investigated, although relatively few were determined to be significantly more important than others. The investigation of the effects of three factors and their possible interactions are detailed below. Through the DOE analysis, two significant factors included: fiber loading (1.0) and the fiber length (0.43). The analysis suggests that maximizing fiber loading and employing the longest possible fiber will result in optimum peel resistance. For example, 5 wt. % of 6.4 mm aramid fiber can be used and retains foam quality. In one aspect, the invention provides a fiber reinforcement approach utilizing improved mixing technology.

From the fracture mechanisms described above, it appears that fiber loading as well as fiber length affects the peel property. Higher fiber loading simply increases the number of fibers in the path of crack propagation, and longer fibers extend the average distance of the micro-peel process. Both factors inhibit crack propagation and dissipate energy, resulting in higher toughness.

For comparison, the results of tensile tests are listed in Table 2, and the stress-strain curves of three phenolic foams compared in FIG. 8. Fracture energies consumed during tensile testing also were calculated by integrating the areas under the stress-strain curves. Compared with neat phenolic foam, the glass-reinforced foam shows remarkably higher Young's modulus, tensile strength and fracture energy in the direction parallel to the foaming direction. However, in the perpendicular direction, these properties are comparable to plain foam. The anisotropy indicates that the glass fibers tend to align in the foaming direction. In contrast, aramid-reinforced foam does not show significant anisotropy, implying another possible attribute of flexible fibers. While aramid-reinforced foam had comparable strength and modulus to plain phenolic foam, it consumed almost twice as much energy during fracture. Note that the tensile fracture energy of glass-reinforced foam was higher than that of aramid-reinforced foam, which reflects the effects of the different loading geometry in the peel test and the tensile test.

TABLE 2

Tensile properties of phenolic foams

| | Parallel* | | | Perpendicular* | |
| --- | --- | --- | --- | --- | --- |
| | Modulus, MPa | Strength, MPa | Fracture energy, kJ/m$^3$ | Modulus, MPa | Strength, MPa |
| Plain | 28.4 | 0.52 | 4.76 | 24.2 | 0.43 |

TABLE 2-continued

Tensile properties of phenolic foams

| | Parallel* | | | Perpendicular* | |
|---|---|---|---|---|---|
| | Modulus, MPa | Strength, MPa | Fracture energy, kJ/m³ | Modulus, MPa | Strength, MPa |
| 5% Glass | 50.0 | 0.87 | 16.2 | 28.5 | 0.51 |
| 5% Aramid | 22.2 | 0.52 | 8.0 | 27.0 | 0.48 |

*With respect to the foaming direction.

Phenolic foam samples were synthesized as described above. Short fiber reinforcements included aramid fibers (Nomex®, from DuPont) and E-glass fibers (from Owens-Corning Inc.), both with a chop length of 6.4 mm (¼ inches). Unless specified otherwise, all foams were fabricated to achieve a density of 80 kg/m³ (5 PCF, pounds per cubic foot). At this density, the cell size of the unreinforced phenolic foam was ~100 mm. Typically, a foam slab was made, and test specimens were sampled from the slab after removal of edges. Finally, desired dimensions were obtained by sectioning with a diamond blade bandsaw. Special attention was given to the cutting direction with respect to the foam rise direction. Sample dimensions were selected to conform to the ASTM specifications for the different tests.

All mechanical tests (except for the friability test) were performed on a universal testing machine (Instron 1330) in accordance with ASTM standards. At least 3 replicates were tested for each specimen, and the results were presented as the averaged value of all replicates with 95% confidence.

Friability was measured with a tumbling box custom-made in accordance with ASTM C421. For each specimen, twelve foam cubes of 25.4 mm (1 in.) side length were mixed with twenty-four oak cubes of 19.0 mm (¾ in.) side length. Samples were measured to an accuracy of one milligram before and after tumbling. Prior to each weighing, each foam cube was cleaned with pressurized air to remove surface dust. Tumbling times were 10 minutes at 60 rpm, as specified by the standard. Images of each specimen were documented before and after the test.

Compression testing was performed in accordance with ASTM D1621. Specimens, 30 mm square by 25.4 mm thick, were compressed between two stainless steel platens, and load was applied with a crosshead speed of 0.5 mm/min (0.02 in./min.). Compressive modulus was taken as the steepest initial slope of the stress-strain curve, and strength was determined from the maximum load (in a range of strain <10%).

Lap shear testing was performed in accordance with the industrial standard, BPS D-124 (Boeing Part Specification (BPS) D124, "Air, Panels and Plenum Insulation, Rigid Plastic Foam, for Low Pressure Systems", Boeing, 1991), and ASTM C273 as well. FIG. 8 illustrates the test configuration and specimen geometry. Foam specimens were bonded to stainless steel plates with a fast-cure epoxy adhesive. An extensometer attached to the shear fixture provided a measure of in-plane shear deformation with accuracy up to 1 μm. The shear modulus was taken as the steepest initial slope of the stress-strain curve, and strength as the peak stress value.

Figure 9:
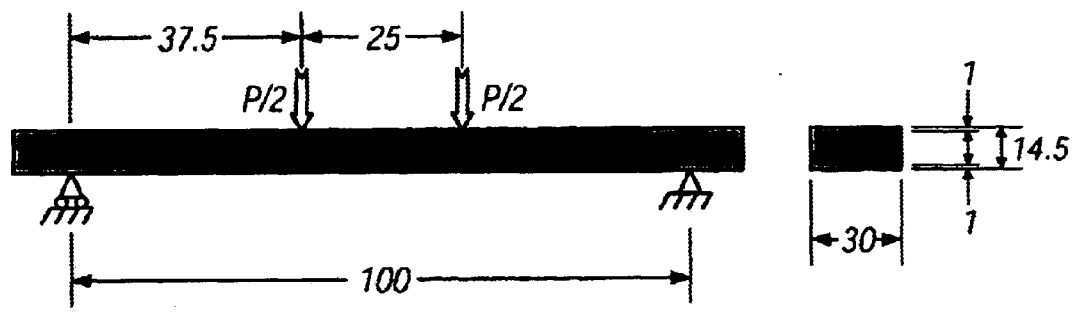
FIG. 9 shows the geometric configuration of four-point bend sandwich beam test.

Four-point bend testing was performed on short sandwich beams in accordance with ASTM C393. Sandwich beam specimens were fabricated with aluminum facesheets and foam cores bonded together with epoxy film adhesive. Similar fabrication techniques have been reported in Sokolinsky et al. (Proc. Ninth Internat.Conf. on Composites Eng. ICCE/9, San Diego, Calif., Jul. 1–6, 2002, pp. 733–734), yielding satisfactory results. Both top and bottom facings were of 1 mm thick aluminum 2024T3 sheet, which had a Young's modulus of 73.2 GPa and ultimate tensile strength of 75 MPa (*Handbook of Aluminum*, Alcan Aluminum Corp., 1970). The test configuration and geometry are shown in FIG. 9, and the shear properties of the foam core were determined using the relations taken from reference (Zenkert, *An Introduction to Sandwich Construction*, Chamelon, London, 1995). In particular, the shear modulus of the foam core is given by $$G_c = \frac{3Lc}{(d+c)^2 b(4C - 0.076L^3/D)} \qquad (1)$$

where:
L=total span of sandwich beam, mm;
c=thickness of the core, mm;
d=height of sandwich beam, mm;
b=width of sandwich beam, mm;
C=overall compliance of sandwich beam, defined as the ratio of the beam's mid-span deflection w (in mm) vs. the overall applied force P (in Newtons); and
D=bending stiffness of sandwich beam, in which E is the Young's modulus of the facings.

The shear strength of the foam core is $$\tau_c = \frac{P_{max}}{(d+c)b} \qquad (2)$$

where $P_{max}$ is the maximum applied force. Formulas (1) and (2) are derived from classical sandwich beam theory (Allen, *Analysis and Design of Structural Sandwich Panels*, Pergamon, Oxford, UK, 1969), which involves some assumptions that can lead to substantial errors in the case of sandwich structures with relatively soft cores and concentrated loading (Swanson et al., J. Sandwich Struct. Mater., 2:33, 2000). However, due to the simple form of the algorithms derived from the classical theory, they are widely used in engineering design and analysis (Zenkert, supra; and ASTM C393-00, "Standard Test Method for Flexural Properties of Flat Sandwich Construction," ASTM, 2002).

A plot of applied force vs. mid-span deflection was obtained for each four-point bend test specimen, and then the steepest initial slope and maximum applied force were extracted from the curve. The inverse of this slope value, namely C, was used to calculate the shear modulus of the foam core, for the purpose of comparison with shear test results. Fractography of the sandwich cores was performed during the test with a Keyence VH-8000 digital microscope.

Figure 10:
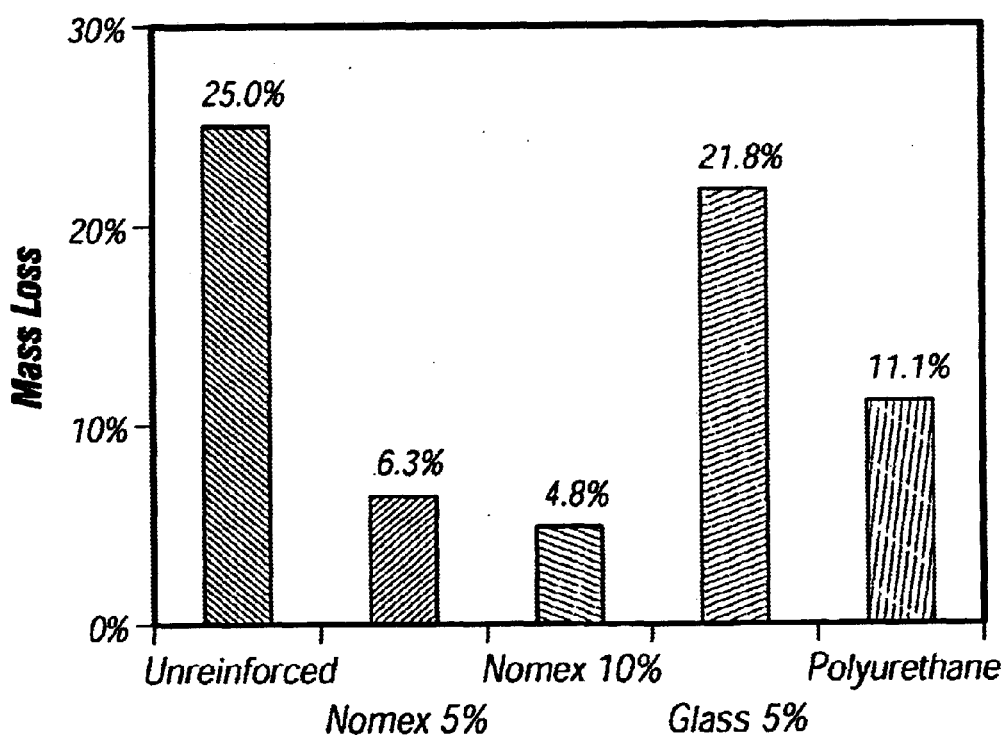
FIG. 10 is a graph showing the friability test results. The data for the commercial polyurethane foam (65 kg/m$^3$ in density, 4 PCF) is estimated previous reports, which used twice as many tumbling cycles as the standard number that were used in this test.
Figure 11A:
FIG. 11 shows shape changes of phenolic foam cubes as result of friability test. (A) Original shape, 1 inch cubic; (B) 5 wt. % Nomex reinforced; (C) unreinforced; and (D) 5 wt. % glass reinforced. The dash line frames represent original shape and size.
Figure 11B:
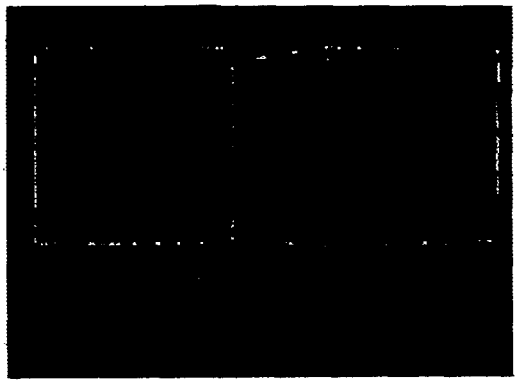
Figure 11C:
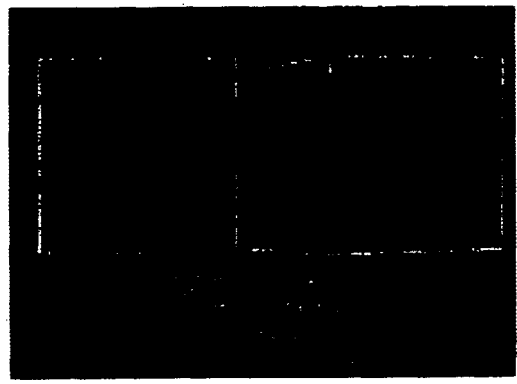

The friability test results shown in FIG. 10 indicate that the addition of aramid fibers results in a significant improvement in the friability of phenolic foam. The mass loss drops from 25% for plain phenolic foam, to less than 5% for the composite foam with 10 wt % aramid fibers, a five-fold decrease. The dramatic improvement implies that the change in friability is associated with an increase in toughness for the reinforced foam. This assertion is supported by a recent investigation of the fracture behavior of composite foam, in which fiber reinforcement resulted in a substantial enhancement in toughness. The capacity of the foam to resist fracture correlates closely with friability, which involves microfractures caused by abrasion and repeated light impact events. As foam friability is reduced, shape retention of the samples improves, as shown in FIG. 11. The shape of aramid fiber-reinforced foam cubes is virtually unchanged by the friability test (FIG. 11b). In contrast, unreinforced foam samples exhibit pronounced edge-rounding (FIG. 11c). The friability performance of the composite phenolic foam also surpasses the performance of the commercial polyurethane foam, which exhibits an estimated mass loss of 11.1% (65 kg/m3 in density, 4 PCF) (Datasheet of Divinycell®H foam product, DIAB Group, 2002; datasheet of Last-A-Foam®6700 series, General Plastics, 2000).

Figure 11D:
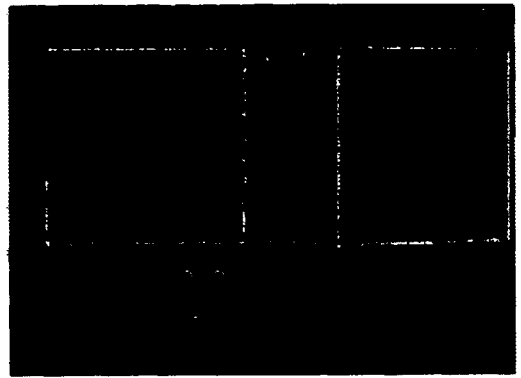

The effect of fiber type on friability is apparent when examining the behavior of glass fiber-reinforced foam. The weight loss behavior is shown in FIG. 10, and the corresponding sample image is shown in FIG. 11d. Surprisingly, the results reveal no significant difference between the glass-reinforced foam and the unreinforced foam. Thus, glass reinforcement is ineffective in improving friability, while aramid fibers are extremely effective. These observations are consistent with the observations presented above with respect to peel strength measurements, in which aramid fibers were effective in enhancing foam toughness than were similar loadings of glass fibers.

Figure 12:
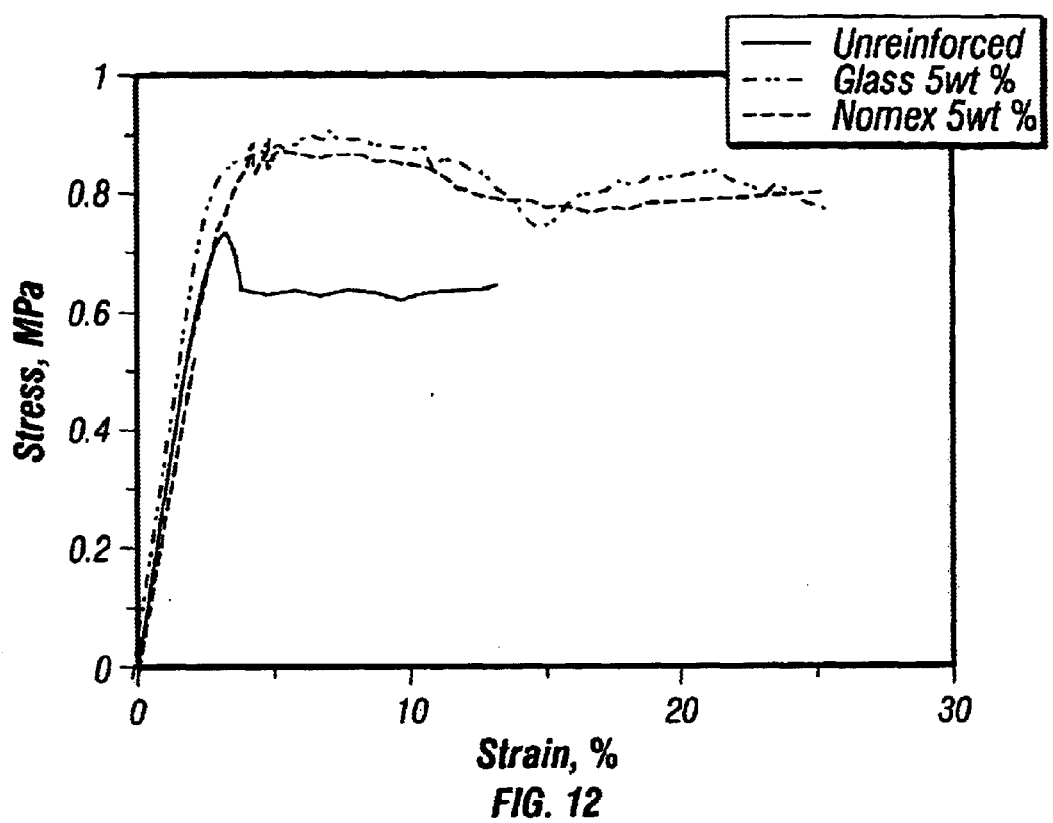
FIG. 12 is a graph depicting the compressive stress-strain relationships of phenolic foams. Loading direction is parallel to the foam rise direction.
Figure 13:
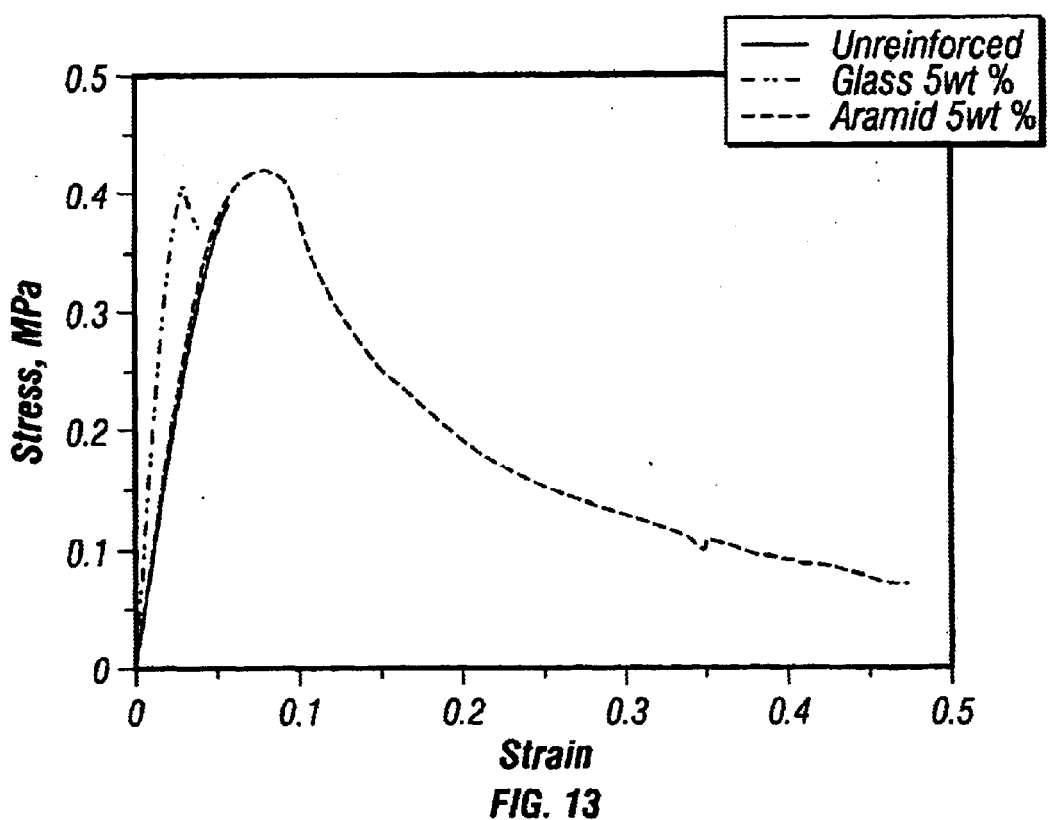
FIG. 13 is a graph showing the typical shear stress-strain relationships of phenolic foams. Shear plane and loading direction both are parallel to the foam rise direction.

Like most plastic foams, phenolic foam exhibits a multi-stage deformation response when subjected to compressive loading. In FIG. 12, the initial part of the compressive stress-strain response is displayed (strain<20%). This is the portion of the deformation response that is most relevant for engineering applications, and contains the key parameters of compressive modulus and strength. The data from several compression tests are summarized in Table 3.

TABLE 3

Compressive properties of foams at density of 80 kilograms/m³

| Properties | Parallel* | | Perpendicular* | | Modulus anisotropy ratio $E_{//}/E_\perp$ |
|---|---|---|---|---|---|
| Foam formulations | Modulus MPa | Strength MPa | Modulus MPa | Strength MPa | |
| Unreinforced | 31.8 | 0.76 | 15.2 | 0.65 | 2.09 |
| 5% Nomex reinforced | 29.1 | 0.90 | 26.8 | 0.71 | 1.09 |
| 10% Nomex reinforced | 31.0 | 0.71 | — | — | — |
| 5% glass reinforced | 33.9 | 0.90 | 19.7 | 0.59 | 1.72 |
| 10% glass reinforced | 62.7 | 1.1 | — | — | — |
| Polyurethane♦ | 26.5 | 0.92 | 14.9 | 0.60 | 1.78 |
| PVC (Divinylcell ® H80)♦ | 85 | 1.2 | — | — | — |

*Loading direction with respect to foam's original foaming direction
♦Data from the manufacture datasheets (Divinycell ®H and Last-A-Foam ® datasheets, supra).

When the compression force is applied parallel to the foaming direction, the modulus of the phenolic foam with 5 wt. % aramid fiber is slightly lower than the unreinforced counterpart, yet the strength is higher. The addition of more aramid fiber (10 wt. %) improves the modulus, but it does not surpass the modulus of unreinforced foam. However, glass fiber additives show a much greater enhancement in compression properties. The addition of 5 wt. % glass fibers causes a modest increase in modulus and strength of phenolic foam. When the loading is doubled to 10 wt. %, the modulus rises to almost twice the value for unreinforced foam, and this is accompanied by a 31% increase in strength.

The effectiveness of glass fibers in enhancing compressive properties exceeds that of aramid fibers, and is similar to the trend above for tensile properties. While this phenomenon can be attributed in part to the relatively higher stiffness of glass fibers compared with aramid Nomex® fibers (*Technical Guide of Nomex® Brand Fiber*, Technical Information, DuPont, 2002), the primary cause is a higher degree of glass fiber orientation along the foaming direction. This argument is supported by the compression tests in which the force was applied perpendicular to the foaming direction. In these tests, the composite foams show the reverse trend—aramid fiber reinforcement is more effective than glass fibers in transverse direction. The variations in foam properties for axial and orthogonal loading directions reflect differences in fiber orientations, and thus anisotropy extant in all of the phenolic foams fabricated.

Gibson and Ashby (*Cellular Solids: Structure and Properties*, Cambridge University Press, UK, 1997) noted that most foams, especially those produced by open mold processes, are anisotropic in the foaming and transverse directions. The anisotropy may arise from two independent factors, structure and material. Using an elongated cubic foam cell model, they derived the dependence of Young's modulus anisotropy ratio on the structural anisotropy alone, and found that $$E_{//}/E_\perp = \frac{2R^2}{1+\left(\frac{1}{R}\right)^3} \quad (3)$$

where $E_{//}$ is the Young's modulus of the foam measured parallel to the foaming direction, $E_\perp$ is the Young's modulus perpendicular to the foaming direction, and R is the shape anisotropy ratio, defined as the ratio of cell height (measured in the foaming direction) to cell width (measured in the transverse direction). This relationship is obtained for open-cell foams, and may be valid for closed-cell foams when the cell membranes are weak and their contribution to foam modulus can be neglected.

Using the framework described above, the modulus anisotropy ratios of the foams were calculated and are listed in Table 3. As the values show, aramid fiber-reinforced phenolic foam is nearly isotropic, with $E_{//}/E_\perp$ approaching 1, whereas the other foams are substantially anisotropic. The shape anisotropy ratio reported for polyurethane foam cells is approximately 1.2 (Gibson and Ashby, supra), and insertion of this R value in equation (3) yields $E_{//}/E_\perp$ of 1.82. This estimation is close to the measured value reported in Table 3, indicating that polyurethane foam behaved like an open-cell foam. If relationship (3) is valid for plain phenolic foam, the shape anisotropy ratio R should be ~1.25. However, for the fiber-reinforced foams, the property anisotropy should stem from material anisotropy as well as from a structural origin. The presence of fibers may modify the process of cell formation during foaming, altering the foam cell morphology from that of plain foam. Meanwhile, fibers in the foam may acquire preferred orientations and non-uniform distribution, resulting in anisotropy of foam properties. Yet another possibility is that aramid fibers may undergo the "micro-peel" process during the foam deformation, causing local stress relaxation and reducing the sensitivity to loading direction.

The data from Table 3 can be used to compare phenolic foam with other commercially available polymer foams. Generally, phenolic foams are stiffer (having higher modulus) than polyurethane foam at the same density, but not as stiff as PVC foam. Although the compressive strength of unreinforced phenolic foam is lower than that of polyurethane and PVC foam, the reinforced phenolic foam achieves comparable level of strength. This indicates that fiber reinforced phenolic foam can be competitive with these structural foams in certain engineering applications, particularly those applications requiring fire resistant properties.

Figure 14:
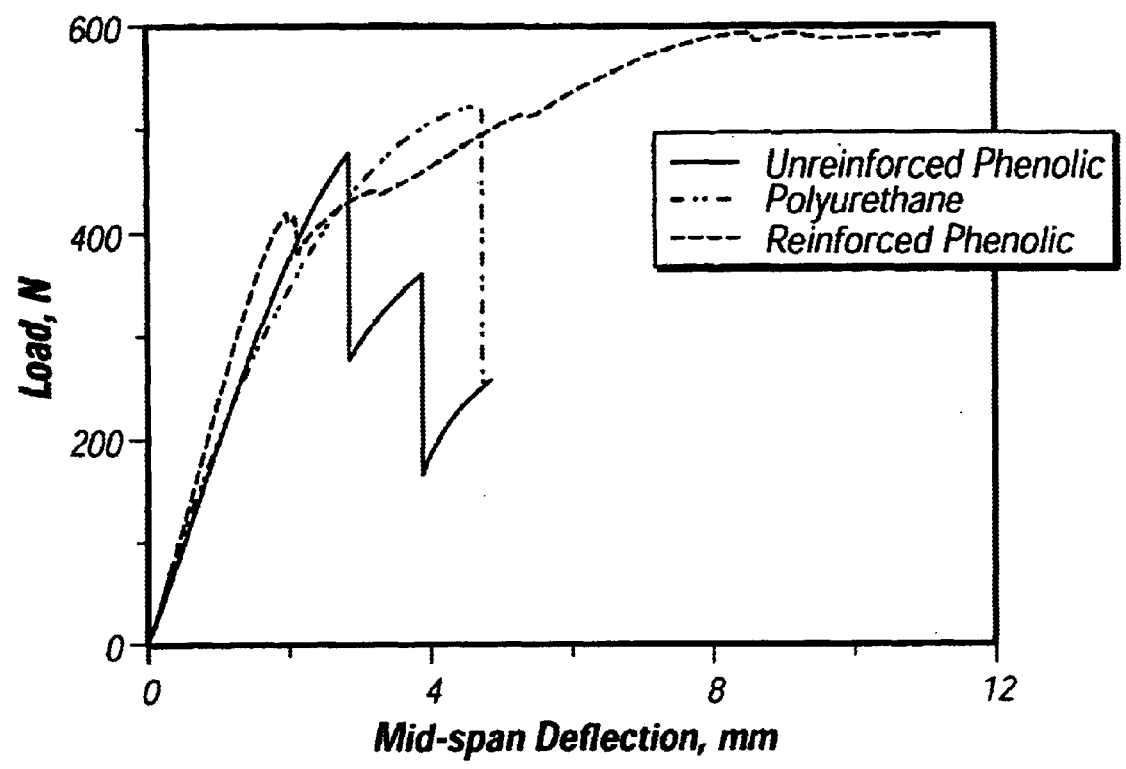
FIG. 14 is a graph showing load vs. mid-span deflection of sandwich beam under four-point bend test.

By design, sandwich cores experience primarily shear stress. Consequently, shear properties are among the most important criteria governing the selection of core materials for sandwich structures. To assess the potential of phenolic foam in such structural applications, the shear properties were measured and are summarized in Table 4. Some typical shear stress-strain curves are also shown in FIG. 14.

TABLE 4

Shear properties of foams at density of 80 kilograms/m$^3$

| Properties | Parallel* | | Perpendicular* | | Modulus anisotropy |
|---|---|---|---|---|---|
| Foam formulations | Modulus MPa | Strength MPa | Modulus MPa | Strength MPa | ratio $G_{//}/G_\perp$ |
| Unreinforced | 12.2 | 0.39 | 15.7 | 0.46 | 0.78 |
| 5% Nomex reinforced | 13.1 | 0.44 | 15.7 | 0.40 | 0.83 |
| 10% Nomex reinforced | 20.0 | 0.46 | — | — | — |
| 5% glass reinforced | 19.3 | 0.41 | 23.7 | 0.57 | 0.81 |
| 10% glass reinforced | 23.2 | 0.53 | — | — | — |
| Polyurethane♦ | 8.0 | 0.63 | 8.7 | 0.61 | 0.93 |
| PVC (Divinycell ® H80)♦ | — | — | 31 | 1.0 | — |

*"Parallel" means both the shear plane and loading force are parallel to the foam's original foaming direction. "Perpendicular" means the shear plane is perpendicular to the foaming direction.
♦Data from the manufacture datasheets.

Both of the reinforced phenolic foams display higher shear moduli than unreinforced foams, and shear strengths comparable to the unreinforced foam. However, glass fiber reinforcements again produce a greater increase in shear stiffness than the aramid fiber counterparts at the same fiber loading. Adding more fibers helps elevate both shear modulus and shear strength significantly. Like the trend in compression performance, the shear modulus of all phenolic foam is in between those of polyurethane and PVC foams, while the shear strength is lower than both.

The data for all the foams in Table 4 indicate a consistently stronger shear resistance on the plane normal to the foaming direction. However, the shear properties are less sensitive to the anisotropy in foam cell structure, as postulated by Gibson and Ashby, supra. A similar index for shear modulus anisotropy, $G_{//}/G_\perp$, is calculated in Table 4. Polyurethane foam is nearly isotropic in shear performance. Among the phenolic foams, aramid fiber reinforced foam exhibits the least anisotropy, while unreinforced foam is the most anisotropic, and glass reinforced foam is in between. However, the difference in modulus anisotropy between the reinforced and unreinforced foams is small, indicating that the anisotropy in shear properties of phenolic foams was insensitive also to material anisotropy.

As shown in FIG. 14, the aramid reinforced phenolic foam displays unique fracture behavior distinct from other foams. The other foams, including the one with glass fibers, show a classically brittle rupture under the maximum loading, accompanied by a sudden drop of stress to near zero in the stress-strain curve. However, the aramid fiber reinforced foam exhibits a smooth decline in stress after the peak in the shear stress-strain curve. The smooth decline in stress that follows the peak stress continues to high strain levels. As a matter of fact, shear testing did not completely break the aramid fiber-reinforced foam specimens, despite strains of up to 50%. Although the mechanism accounting for this unique fracture behavior is not completely understood, the apparent resistance to shear loading and enhanced toughness is attributed to fiber bridging effects associated with the relatively flexible aramid fibers in the foam. A similar postulation has been given for the peel resistance of aramid fiber reinforced phenolic foam. Moreover, similar phenomena were also encountered in sandwich beam flexure tests, in which images of fiber bridging at crack wakes were captured with a microscope. The results are discussed below.

Figure 15A:
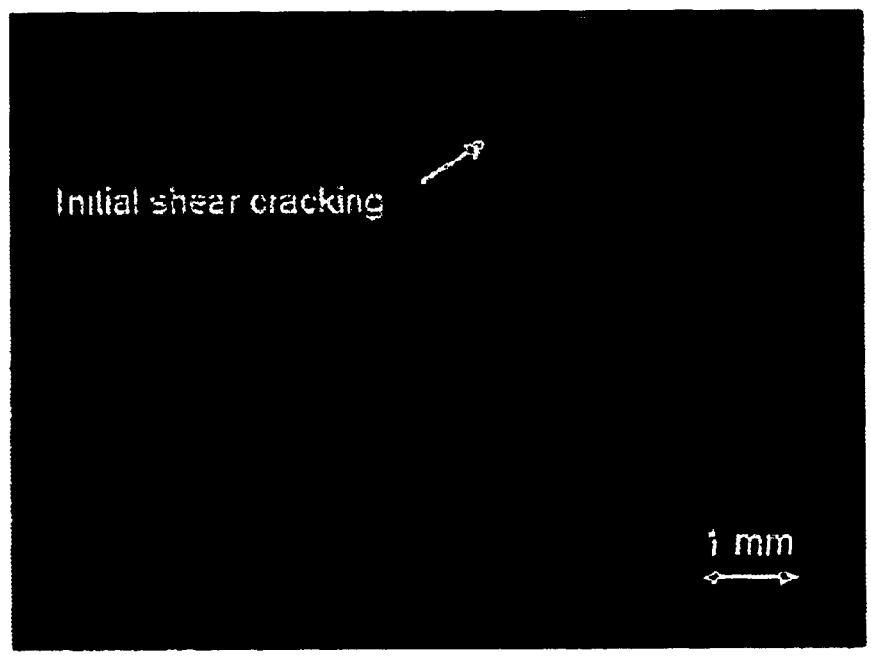
FIG. 15 shows shear cracking in reinforced phenolic foam core during sandwich beam bend test.

The flexural behavior of sandwich beams with different cores is depicted in FIG. 15, which shows plots of total load vs. the mid-span deflection for the different beams. The behavior of the beam with 5 wt. % aramid fiber-reinforced phenolic foam core is distinct from the other materials. Unlike the other beams, which exhibit drastic decreases in load-bearing capacity once initial failure occurs, the aramid fiber-reinforced foam core sandwich beam maintains load-bearing capacity even after the damage initiation, continuing up to much higher loads and deflection. The slight load drop at 400 N corresponds to minor cracking in the foam core (FIG. 15*a*), representing the initiation of shear damage in the aramid fiber-reinforced phenolic foam. However, as previously seen in shear tests, the crack is stable and does not propagate quickly because of fiber bridging along the crack wake (FIG. 15*b*). Thus, the core's strong resistance to shear cracking damage leads to a "tough" sandwich structure that does not exhibit catastrophic collapse. Instead, the structure recovers the capacity to carry load, and the load increases substantially as the beam continues to deflect. This feature indicates the potential of fiber-reinforced foam cores to tolerate damage and to significantly reduce the risk of catastrophic failure of sandwich structures. The conventional approach to avoid a catastrophic collapse of structural elements is to increase the safety factor used in design (Blockley (ed.), *Engineering Safety*, McGraw-Hill Co., London, 1992), leading to overdesign and unnecessary costs and waste of materials. Such waste can be avoided if reinforced foams are used as core materials in sandwich structures.

The shear properties of foam cores were derived from the load-deflection relationships obtained from sandwich beam flexure tests, and these are listed in Table 5. Generally, the data show trends consistent with those seen in the shear test results—the moduli are comparable, while the strengths are lower than the polyurethane foams. Short sandwich beam tests may yield higher shear strength values than ordinary shear tests because the face sheets may carry a considerable portion of the shear loading (ASTM C393-00, "Standard Test Method for Flexural Properties of Flat Sandwich Construction," ASTM, 2002). This skin "strengthening" effect is examined in Table 5 by calculating the relative deviation of beam test results from the regular shear test data. As the values show, the effect leads to an apparent increase in the strengths of phenolic foams, but for polyurethane foam cores the difference in strength is negligible within experimental error, indicating no skin strengthening effect at all. However, for shear modulus values, the short beam test results are consistently lower than those of lap shear tests. This apparent discrepancy can be attributed to the inherent deficiency of the formula (1) used to calculate shear modulus, which is based on classical sandwich theory (Allen, supra). In the case of a relatively soft core, the classical sandwich theory underestimates the shear stiffness by up to 20%. Low-density polymer foams typically have 2–4 orders of magnitude lower stiffness than metal or composite materials, and when used as sandwich cores with metal or composite skins, they behave as "soft" cores. Therefore, a correction factor must be introduced in the formula for shear modulus determined from short beam shear test results in order to report accurate values. This represents a challenge to the theorist working on problems of sandwich structure mechanics.

TABLE 5

Shear properties obtained from short beam sandwich test

| | Density | Modulus | Strength | Relative deviation from lap shear test data (%) | |
| --- | --- | --- | --- | --- | --- |
| | Kg/m$^3$ | MPa | MPa | Modulus | Strength |
| Unreinforced | 80 | 9.89 | 0.56 | −18.9 | +47.4 |
| 5% Nomex reinforced | 80 | 11.2 | 0.52 | −14.5 | +18.2 |
| Polyurethane 6pcf* | 96 | 9.96 | 0.72 | −6.9 | −7.7 |

*Data from the manufacture datasheets.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising:
 a phenolic foam material and a fibrous material, wherein fibers of the fibrous material have lengths of about 0.5 mm to 30 mm.

2. A flexible-fibrous reinforced phenolic foam comprising fibrous material having lengths of about 0.5 mm to 30 mm.

3. A composition comprising:
 a phenolic resol resin;
 at least one surfactant;
 a phenol sulfate acid (PSA);
 a pentane; and
 a fiberous material, wherein fibers of the fibrous material have lengths of about 0.5 mm to 30 mm.

4. The composition of claim 3, wherein the weight percent of the phenolic resol resin in the composition is about 75%–92%.

5. The composition of claim 3, wherein the total weight percent of the surfactant in the composition is about 2%–5%.

6. The composition of claim 3, wherein the weight percent of the PSA in the composition is about 2%–8%.

7. The composition of claim 3, wherein the weight percent of the fibrous material is from about 1–20%.

8. The composition of claim 7, wherein the weight percent of the fibrous material is 3%.

9. The composition of claim 3, wherein the amount of PSA in the composition is reduced relative to the amount of fibrous material in the composition.

10. The composition of claim 3, wherein the fibrous material is a glass fibrous material and/or an aramid fibrous material.

11. The composition of claim 10, wherein the glass fibers comprise a diameter of about 12–20 μm and included a phenolic compatible sizing.

12. The composition of claim 10, wherein the aramid fibers comprise a diameter of about 12–20 μm.

13. A fire resistant material comprising:
 a phenolic foam reinforced with a fibrous material, wherein fibers of the fibrous material have lengths of about 0.5 mm to 30 mm.

14. A fibrous-reinforced phenolic foam made by a method comprising:
 mixing a phenol formaldehyde resin with a blowing agent, a cell stabilizer, a hardener, and a fibrous material, under conditions whereby the fibrous material is integrated into the phenolic foam and wherein fibers of the fibrous material have lengths of about 0.5 mm to 30 mm.

15. The fibrous-reinforced phenolic foam of claim 14, wherein the mixture is expanded by applying a heat to a mold comprising the mixture.

16. The fibrous-reinforced phenolic foam of claim 15, wherein the mold comprises a hole plate insert that reduces air entrapments in the fiber slurry.

17. The fibrous-reinforced phenolic foam of claim 16, wherein the hole plate comprises an array of holes of a predetermined size.

18. The fibrous-reinforced phenolic foam of claim 15, wherein the heat is applied in a range of about 30–90° C.

19. The fibrous-reinforced phenolic foam of claim 14, wherein the foam has a density of about 35–200 kg/m$^3$.

20. A method of making a fibrous-reinforced phenolic foam, comprising mixing a phenol formaldehyde resin, a blowing agent, and a cell stabilizer,
 degassing the mixture,
 mixing in a fibrous material, wherein fibers of the fibrous material have lengths of about 0.5 mm to 30 mm,
 allowing the mixture to cool,
 mixing in a hardener, and
 allowing the foam to form.

* * * * *

UNITED STATES PATENT AND TRADEMARK OFFICE
Certificate

Patent No. 6,841,584 B2            Patented: January 11, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven R. Nutt, Irvine, CA (US); Hongbin Shen, Alhambra, CA (US); and J. Andrè Lavoie, Blacksburg, VA (US).

Signed and Sealed this Thirteenth Day of May 2014.

JAMES SEIDLECK
*Supervisory Patent Examiner*
Art Unit 1765
Technology Center 1700